United States Patent
Kishi et al.

(10) Patent No.: US 9,785,641 B2
(45) Date of Patent: *Oct. 10, 2017

(54) REDUCING A BACKUP TIME OF A BACKUP OF DATA FILES

(75) Inventors: Gregory T. Kishi, Oro Valley, AZ (US); Sven Oehme, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1781 days.

This patent is subject to a terminal disclaimer.

(21) Appl. No.: 13/078,413

(22) Filed: Apr. 1, 2011

(65) Prior Publication Data

US 2012/0254117 A1    Oct. 4, 2012

(51) Int. Cl.
*G06F 17/00* (2006.01)
*G06F 17/30* (2006.01)
*G06F 11/14* (2006.01)

(52) U.S. Cl.
CPC .... *G06F 17/30091* (2013.01); *G06F 11/1451* (2013.01); *G06F 11/1464* (2013.01)

(58) Field of Classification Search
CPC .................................................. G06F 12/0862
USPC ........................................................ 707/719
See application file for complete search history.

(56) References Cited

U.S. PATENT DOCUMENTS

| | | | |
|---|---|---|---|
| 5,276,867 A * | 1/1994 | Kenley et al. | |
| 6,026,414 A | 2/2000 | Anglin | |
| 6,067,599 A | 5/2000 | Kishi et al. | |
| 6,360,330 B1 * | 3/2002 | Mutalik | G06F 11/1466 707/999.003 |
| 6,549,992 B1 * | 4/2003 | Armangau | G06F 11/1456 707/999.202 |
| 6,816,957 B1 | 11/2004 | Halladay et al. | |
| 6,938,120 B2 | 8/2005 | Gibble et al. | |
| 6,993,629 B2 | 1/2006 | Beardsley et al. | |
| 7,120,759 B2 | 10/2006 | Chiu et al. | |
| 7,546,484 B2 | 6/2009 | Sen et al. | |
| 7,574,435 B2 | 8/2009 | Anglin et al. | |
| 7,693,884 B2 | 4/2010 | Akelbein et al. | |
| 7,702,664 B2 | 4/2010 | Jankowsky et al. | |
| 7,716,186 B2 | 5/2010 | Cannon et al. | |

(Continued)

OTHER PUBLICATIONS

U.S. Appl. No. 13/778,745.
Office Action mailed Oct. 10, 2013 for U.S. Appl. No. 13/778,745; 21 pages.

*Primary Examiner* — Augustine K Obisesan
*Assistant Examiner* — Lahcen Ennaji
(74) *Attorney, Agent, or Firm* — Francis Lammes; Stephen J. Walder, Jr.; Randell J. Bluestone

(57) ABSTRACT

A mechanism is provided for reducing the backup time of data files from a memory. Data files are pre-staged by identifying the data files in the memory to be backed up to a backup storage system, sorting the data files by size thereby forming a set of small data files and a set of large data files, and copying the set of small data files to a cache while leaving the set of large data files in a disk subsystem. The set of small data files are then backed-up from the cache and the set of large data files are backed-up from the disk subsystem to a backup storage system. Thus, the time required to backup the set of small data files from the cache is performed at a faster rate as compared to backing up the set of large data files from the disk subsystem.

16 Claims, 6 Drawing Sheets

(56) References Cited

U.S. PATENT DOCUMENTS

| | | | |
|---|---|---|---|
| 8,005,797 B1* | 8/2011 | Chepel | G06F 11/1451 |
| | | | 707/649 |
| 8,843,459 B1* | 9/2014 | Aston | G06F 17/30067 |
| | | | 707/694 |
| 2003/0004947 A1* | 1/2003 | Coverston | G06F 17/30067 |
| 2003/0126247 A1* | 7/2003 | Strasser et al. | 709/223 |
| 2003/0136942 A1 | 7/2003 | Smith et al. | |
| 2003/0236942 A1* | 12/2003 | Kishi et al. | 711/113 |
| 2004/0163029 A1* | 8/2004 | Foley et al. | 714/769 |
| 2005/0021566 A1* | 1/2005 | Mu | G06F 11/1458 |
| 2005/0131990 A1* | 6/2005 | Jewell | G06F 11/1464 |
| | | | 709/201 |
| 2007/0078901 A1* | 4/2007 | Satou et al. | 707/200 |
| 2007/0118693 A1* | 5/2007 | Brannon et al. | 711/118 |
| 2008/0184329 A1 | 7/2008 | Cross et al. | |
| 2008/0307178 A1 | 12/2008 | Agombar et al. | |
| 2008/0307527 A1 | 12/2008 | Kaczmarski et al. | |
| 2009/0222509 A1 | 9/2009 | King et al. | |
| 2011/0289126 A1* | 11/2011 | Aikas | H04L 29/08729 |
| | | | 707/827 |
| 2011/0320436 A1* | 12/2011 | Hokanson | 707/719 |

* cited by examiner

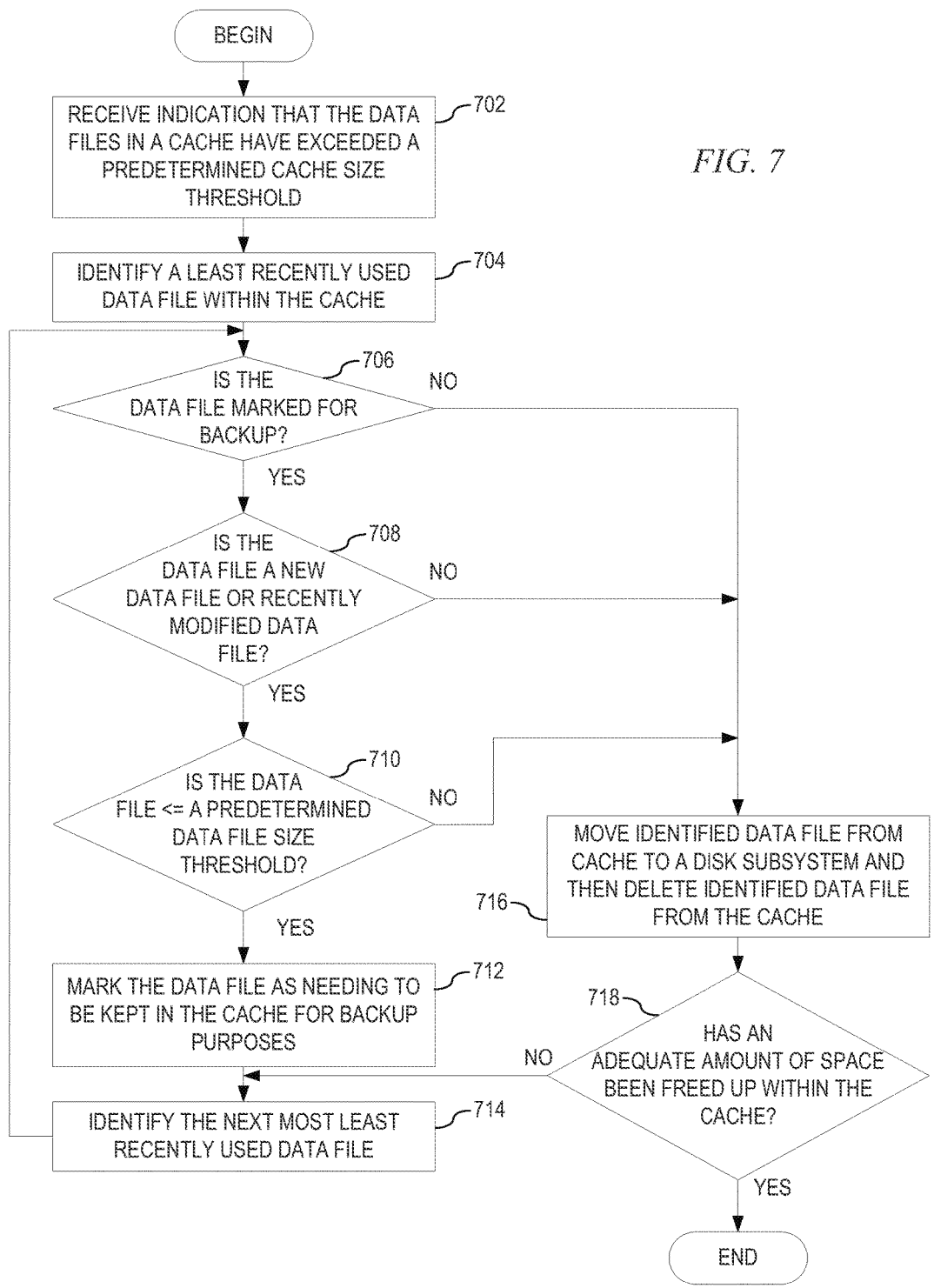

US 9,785,641 B2

REDUCING A BACKUP TIME OF A BACKUP OF DATA FILES

BACKGROUND

The present application relates generally to an improved data processing apparatus and method and more specifically to mechanisms for reducing a backup time of a backup of data files from a memory in the data processing system.

A backup or the process of backing up refers to making copies of data so that these additional copies may be used to restore the original after a data loss event. Backups are useful primarily for two purposes. The first is to restore a state following a disaster (called disaster recovery). The second is to restore small numbers of files after they have been accidentally deleted or corrupted.

Since a backup system contains at least one copy of all data worth saving, the data storage requirements are considerable. Organizing this storage space and managing the backup process is a complicated undertaking. A data repository model can be used to provide structure to the storage. In the modern era of computing there are many different types of data storage devices that are useful for making backups. There are also many different ways in which these devices can be arranged to provide geographic redundancy, data security, and portability.

Before data is sent to its storage location, it is selected, extracted, and manipulated. Many different techniques have been developed to optimize the backup procedure. These include optimizations for dealing with open files and live data sources as well as compression, encryption, and de-duplication, among others. Many organizations and individuals try to have confidence that the process is working as expected and work to define measurements and validation techniques. It is also important to recognize the limitations and human factors involved in any backup scheme.

SUMMARY

In one illustrative embodiment, a method, in a data processing system, is provided for reducing the backup time of data files from a memory. The illustrative embodiment pre-stages the data files by: identifying the data files in the memory to be backed up to a backup storage system; sorting, by the processor, the data files by size, thereby forming a set of small data files and a set of large data files; and copying, by the processor, the set of small data files to a cache within the memory while leaving the set of large data files in a disk subsystem within the memory. The illustrative embodiment backs up the set of small data files from the cache and the set of large data files from the disk subsystem to a backup storage system. In the illustrative embodiment a time required to backup the set of small data files from the cache is performed at a faster rate as compared to hacking up the set of large data files from the disk subsystem due to a reduction in access time required to access each of the small data files.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts an exemplary flow diagram of an ongoing operation performed by a pre-staging mechanism executed by a processor in accordance with an illustrative embodiment.

DETAILED DESCRIPTION

The illustrative embodiments provide a mechanism for reducing the backup time of a backup of data files. By improving small data file performance, the overall backup performance may be improved. In the case of a backup of small data files, a disk read operation becomes a random seek for each data file on a disk subsystem, which significantly reduces the rate that data may be retrieved from the disk subsystem. In addition, because there is an overhead on top of the disk access for each block of data, additional time is consumed is each small data file backup. Further, there are only a limited number of backup threads that may be run at the same time from a node that performs a backup, which additionally impacts backup performance from a node. Both the low disk read activity and the underutilization of backup threads may lead to underutilization of the network bandwidth to the backup server and extended backup durations. Thus, the illustrative embodiments provide a mechanism that reduces the backup time of a backup of data files.

Figure 1:
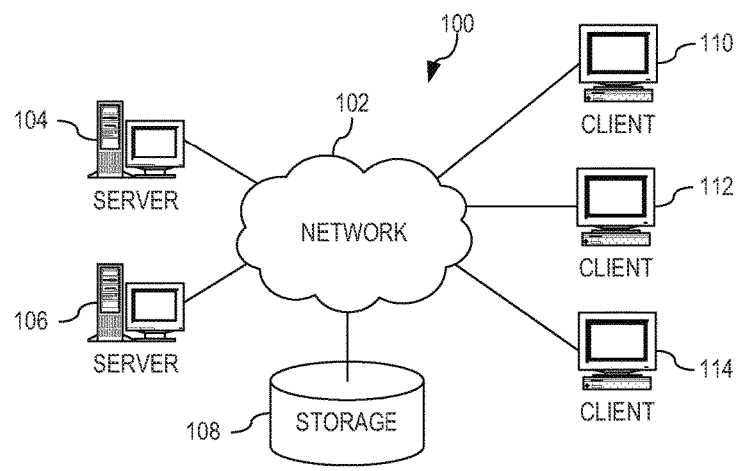
FIG. 1 is depicts a pictorial representation of an example distributed data processing system in which aspects of the illustrative embodiments may be implemented.
Figure 2:
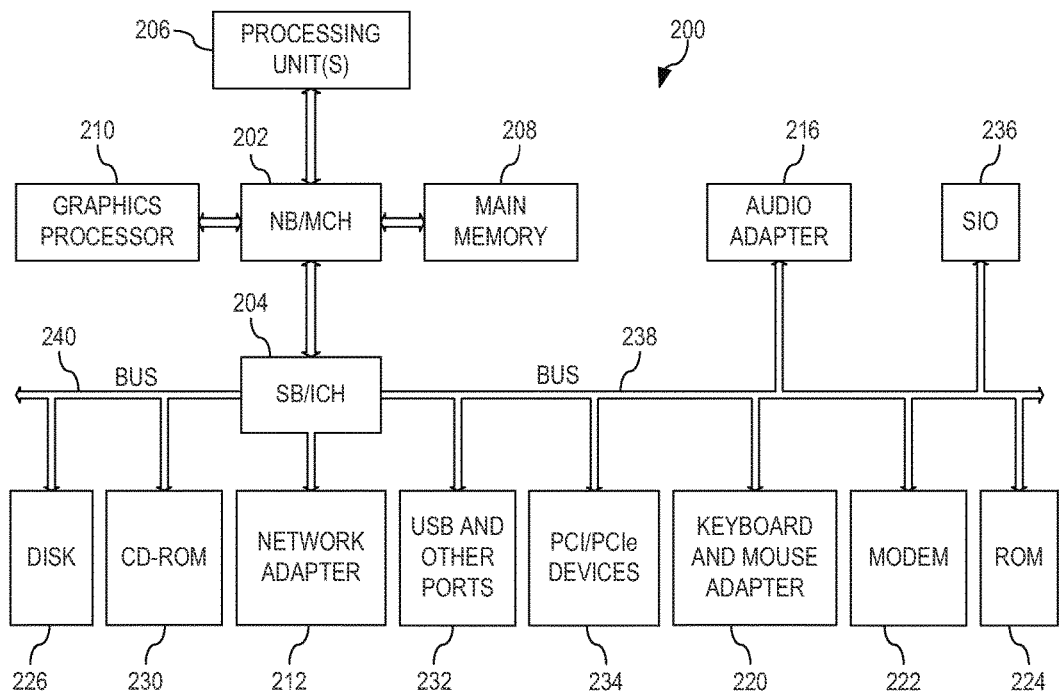
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like, in order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hill) (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, white PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit an scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Again, the illustrative embodiments provide a mechanism for reducing the backup time of a backup of data files. Generally, in known computing systems, data may be transferred from a cache at a much faster rate that from a disk subsystem. For example, data may be transferred out of a cache on a 10 Gb Ethernet connection at approximately 1000 MB/see. In contradistinction, the data transfer rate for a disk subsystem is much slower, for example, approximately 100 MB/sec out of a disk subsystem on a 10 Gb Ethernet connection. Additionally, the access time for a cache is essentially zero when compared to the access time of a disk subsystem, which may be, for example, approximately 10 milli-seconds per data file.

Thus, the mechanism of the illustrative embodiments creates a list of candidate small data files. These small data files are transferred, prior to the actual backup, to the cache of the computing system. Then during the backup, small data file backup performance is improved because the small data files may be moved from cache at the higher transfer rate thereby virtually eliminating the access time that would have been required for accessing each of these small data files from the disk subsystem. Further, because the overhead of the access time is virtually eliminated, the number of backup threads is reduced required to make a backup perform at full network or server bandwidth, easing the implementation of backup applications.

Figure 3A:
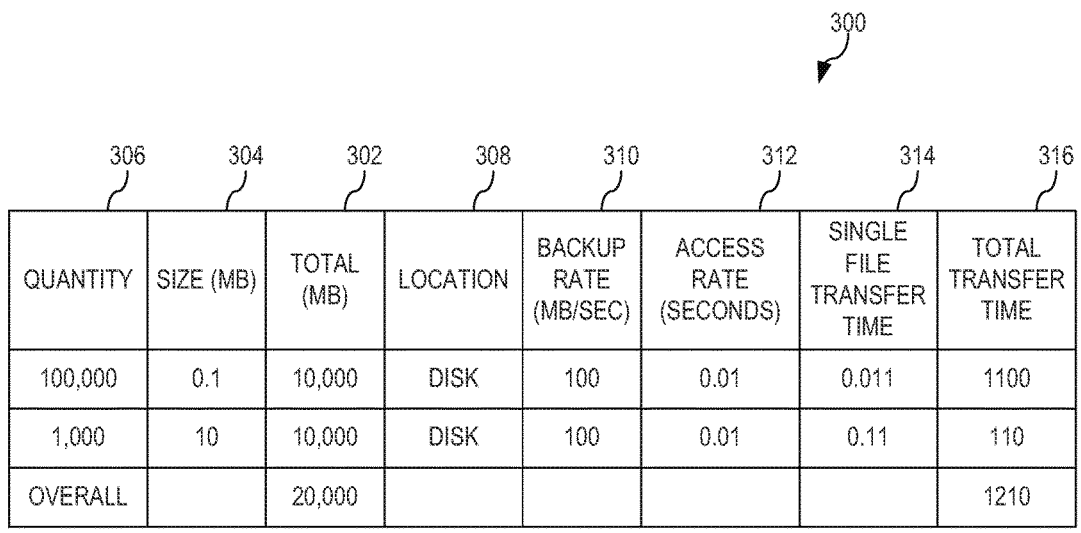
FIG. 3A depicts an exemplary diagram of a data processing system in which all data files are backed up from a disk subsystem in accordance with an illustrative embodiment.

FIG. 3A depicts an exemplary diagram of a data processing system in which all data files are backed up from a disk subsystem, such as main memory 208 of FIG. 2, in accordance with an illustrative embodiment. In this example, data processing system 300 may comprise a total of 20,000 MB of data files (Total Mega Byte (MB), column 302) of which 10,000 MB are small data files of size 0.1 MB (Size in MB, column 304), which are equivalent to 100,000 small data files (Quantity, column 306), and the other 10,000 MB are large data files of size 10 MB (Size in MB, column 304), which are equivalent to 1,000 large data files (Quantity, column 306). Hall of the data files were stored on a disk subsystem (Location, column 308), then a backup of each small data file, at 100 MB/second (Backup Rae, column 310) with an access rate of 10 milli-seconds per data tile (Access Rate, column 312), would be 0.011 seconds (Single File Transfer Time, column 314). For each large data file, the backup would be 0.11 seconds (Single File Transfer Time, column 314) at 100 MB/second (Backup Rate, column 310) with an access rate of 10 milli-seconds per data tile (Access Rate, column 312). Thus, a backup of the 20,000 MB of data files stored on a disk subsystem would take 1210 seconds (Total Transfer Time, column 316). An important aspect to point out is the time to transfer a single small data file from the disk subsystem is predominantly due to the disk access time. Since the file is small, the transfer time is minimal and what makes processing small data files slow is that each small data tile has to be individually accessed (disk seek) from the disk subsystem.

Figure 3B:
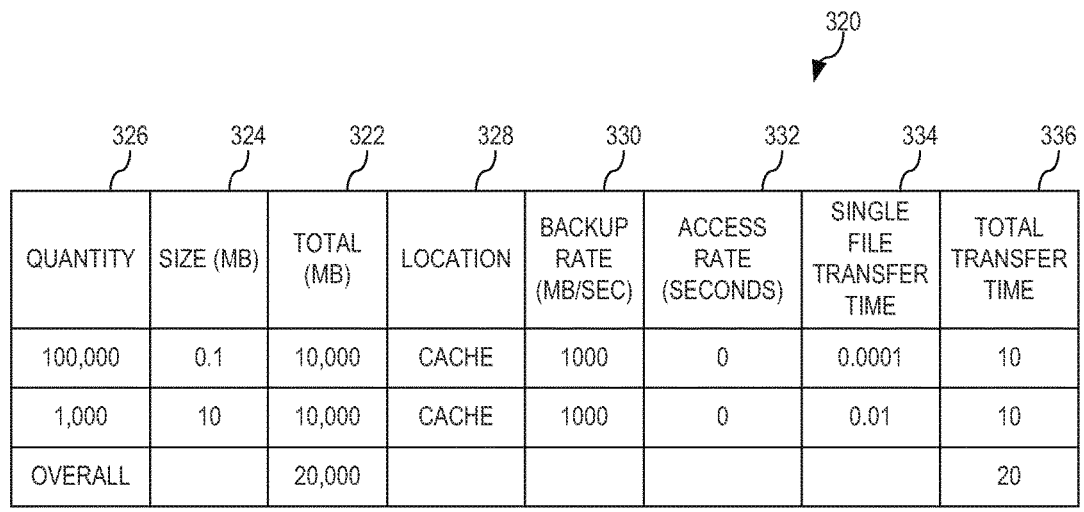
FIG. 3B depicts an exemplary diagram of a data processing system in which all data files are backed up from a cache in accordance with an illustrative embodiment.

FIG. 3B depicts an exemplary diagram of a data processing system in which all data files are backed up from a cache, such as a cache found in NB/MCH 202 of FIG. 2, in accordance with an illustrative embodiment. In this example, data processing system 320 also comprises 20,000 MB of data files (Total Mega Byte (MB), column 322) of which 10,000 MB are small data files of size 0.1 MB (Size in MB, column 324), which are equivalent to 100,000 small data files (Quantity, column 326), and the other 10,000 MB are large data files of size 10 MB (Size in MB, column 324)) which are equivalent to 1,000 large data files (Quantity, column 326). With all of the data files being stored in the cache (Location, column 328), a backup of each small data file, at 1000 MB/second (Backup Rate, column 330) with a negligible access rate (Access Rate, column 332), would be 0.0001 seconds (Single File Transfer Time, column 334). For each large data file, the backup would be 0.01 seconds (Single File Transfer Time, column 334) at (1000 MB/second (Backup Rate, column 330) and a negligible access rate (Access Rate, column 332). Thus, a backup of the 20,000 MB of data files stored in the cache would take only 20 seconds (Total Transfer Time, column 336). However, storing all 20,000 MB of data files in a cache is very expensive.

Figure 3C:
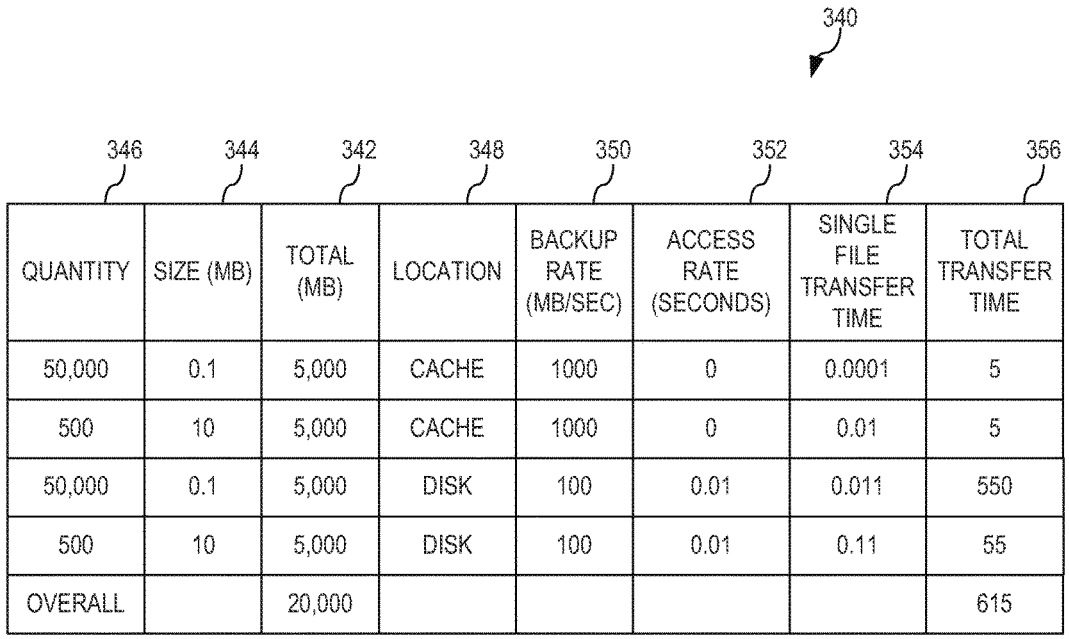
FIG. 3C depicts an exemplary diagram of a more current data processing system in which data files are backed up from both a cache and a disk subsystem in accordance with an illustrative embodiment.

FIG. 3C depicts an exemplary diagram of a more current data processing system in which data files are backed up from both a cache and a disk subsystem, such as a cache found in NB/MCH 202 and main memory 208 of FIG. 2, respectively, in accordance with an illustrative embodiment. That is, currently, data processing systems use a cache on a least recently used (LRU) basis where the cache stores LRU data files and the disk subsystem stores the remaining data files. In this example, data processing system 340 utilizes both a cache and a disk subsystem, where half of the 20,000 MB of small data files and the large data files are stored in the cache and the other half of the small data files and other half of the large data files are stored in the disk subsystem (Total Mega Byte (MB), column 342).

That is, 5,000 MB are small data files of size 0.1 MB (Size in MB, column 344), which are equivalent to 50,000 small data files (Quantity, column 346) are stored in the cache (Location, column 348) and 5,000 MB of small data files of size 0.1 MB (Size in MB, column 344), which are equivalent to 50,000 small data files (Quantity, column 346) are stored in the disk subsystem (Location, column 348). Similarly, 5,000 MB are large data files of size 10 MB (Size in MB, column 344), which are equivalent to 500 large data files (Quantity, column 346) are stored in the cache (Location, column 348) and 5,000 MB of large data files of size 10 MB (Size in MB, column 344), which are equivalent to 500 large data files (Quantity, column 346) are stored in the disk subsystem (Location, column 348).

Then a backup of each small data file in disk subsystem, at 100 MB/second (Backup Rate, column 350) with an access rate of 10 milli-seconds per data file (Access Rate, column 352), would be 0.011 seconds (Single File Transfer Time, column 354). For each large data file, the backup would be 0.11 seconds (Single File Transfer Time, column 354) at 100 MB/second (Backup Rate, column 350) with an access rate of 10 milli-seconds per data file (Access Rate, column 352). Thus, a backup of the 10,000 MB of data files stored on the disk subsystem would take 605 seconds (Total Transfer Time, column 356). Additionally, a backup of each small data file in cache, at 1000 MB/second (Backup Rate, column 350) with a negligible access rate (Access Rate, column 352), would be 0.0001 seconds (Single File Transfer Time, column 354). For each large data file in cache, the backup would be 0.01 seconds (Single File Transfer Time, column 354) at 1000 MB/second (Backup Rate, column 350) and a negligible access rate (Access Rate, column 352). Thus, a backup of the 10,000 MB of data files stored in the cache would take only 10 seconds (Total Transfer Time, column 356). The total backup of the 20,000 MB of data files from the cache and the disk subsystem would be 615 seconds (Total Transfer Time, column 356).

Therefore, as is illustrated in these examples, reduced backup time is achieved by reducing the access time of accessing the data files from the disk subsystem. In order to obtain the greatest reduction in the time required to perform a backup without the expense of adding additional cache, the illustrative embodiments provide a pre-stage module that prioritizes the data files such that greatest number of smaller data files reside in the cache prior to the beginning of a backup process. That is, due to the nature of backup processes, the critical period of time is the amount of time it takes to complete a backup.

Figure 4:
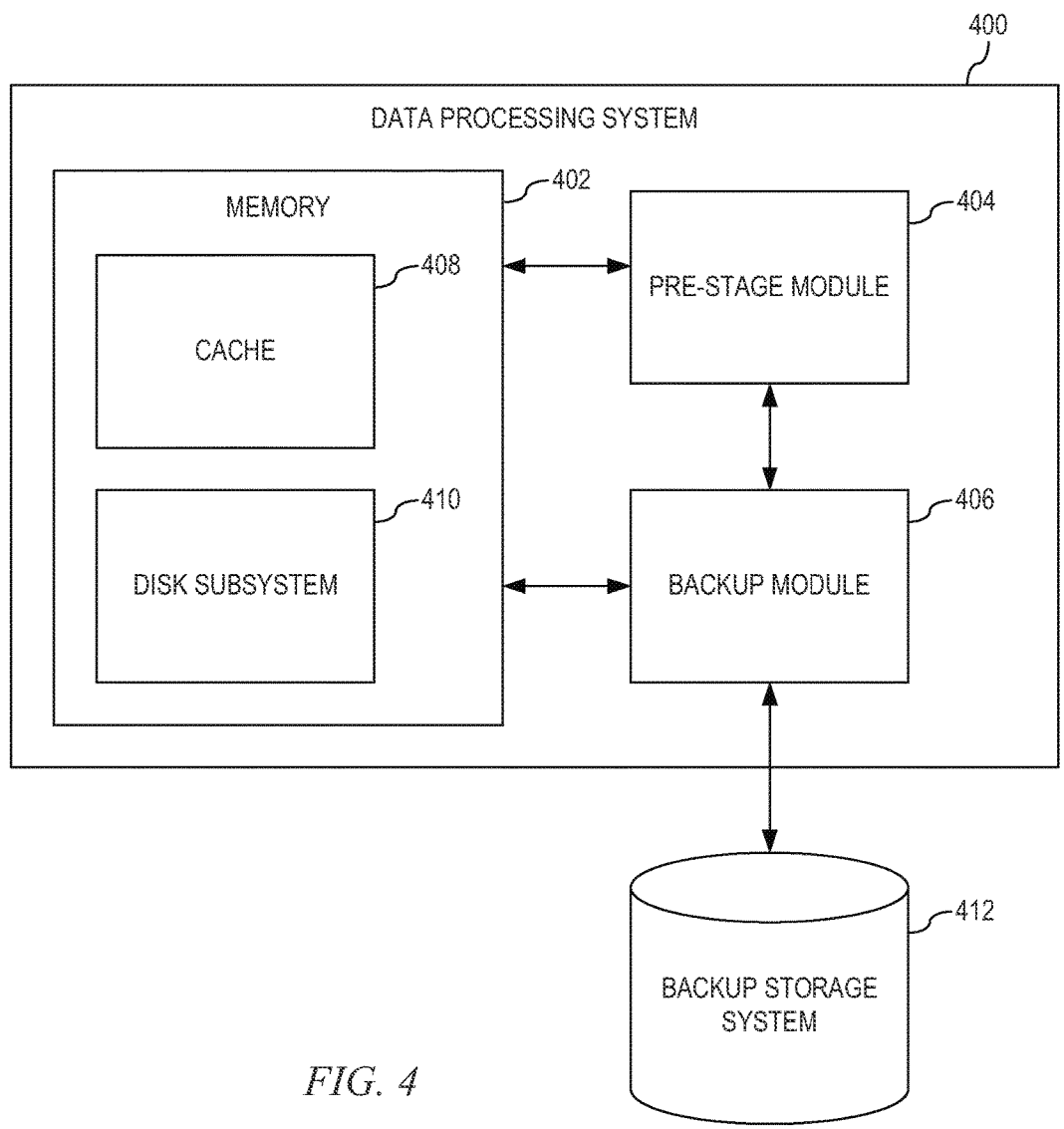
FIG. 4 depicts an exemplary block diagram of a data processing system in which a backup time reduction mechanism is implemented in accordance with an illustrative embodiment.

FIG. 4 depicts an exemplary block diagram of a data processing system in which a backup time reduction mechanism is implemented in accordance with an illustrative embodiment. Data processing system 400 comprises memory 402, pre-stage module 404, and backup module 406. Memory 402 includes both cache 408 and disk subsystem 410. Upon receiving a notification from backup module 406 that a backup of memory 402 is imminent, pre-stage module 404 identifies the data files in memory 402 that are to be backed up to backup storage system 412. Depending on implementation, all of the data files in memory 402 may be marked for backup or only a portion of the files may be marked for backup based on a preference indicated by the user of data processing system 400. If the backup that is to be performed is the initial backup, then pre-stage module 404 may identify all of the marked data files in memory 402 for backup. If the backup is a backup subsequent to the initial backup, then pre-stage module 404 may identify only those marked data files that have been modified since the last backup as well as any data files that have not been backed up before and are marked for backup. However, based on the user's preference, subsequent backups may backup all marked data files.

Once pre-stage module 404 identifies all files that are to be backed up, then pre-stage module 404 sorts the data files by size. Pre-stage module 404 may then identify whether any of the smaller data files already reside in cache 408 and whether any of the larger data files are resident within cache 408. If any of the smaller data files already reside in cache 408, then those smaller data files do not need to be transferred to cache 408. For any of the larger data files, pre-stage module 404 transfers/writes, if not already written, the larger data files to disk subsystem 410 and then removes the larger data files from cache 408 thereby making room for smaller data files. Once all of the larger data files have been transferred to disk subsystem 410 and removed from cache 408, pre-stage module 404 proceeds to copy as many smaller data files not already resident in cache 408 to cache 408 starting with the smallest data files first. Again, by copying each small data file to cache 408, pre-stage module 404 reduces the time required for performing the backup by, for example, 0.01 seconds in keeping with the previous examples.

As pre-stage module 404 completes copying of the smallest data files to cache 408, pre-stage module 404 notifies backup module 406 that pre-staging is complete. Backup module 406 then proceeds to copy all of the marked data files from cache 408 first to backup storage system 412 and then all remaining files from disk subsystem 410 to backup storage system 412.

Thus, the pre-staging of data files occurs prior to the start of the backup window and, although pre-staging itself requires some time to pre-stage the files into the cache, the pre-staging time is not part of the backup window itself. Once pre-staging has completed, in this example, cache 408 is full of smaller data files and the larger files reside on disk subsystem 410. Additionally, the backup time reduction mechanism of the illustrative embodiments greatly reduces the time needed for backup of the data files in memory 402.

Figure 5:
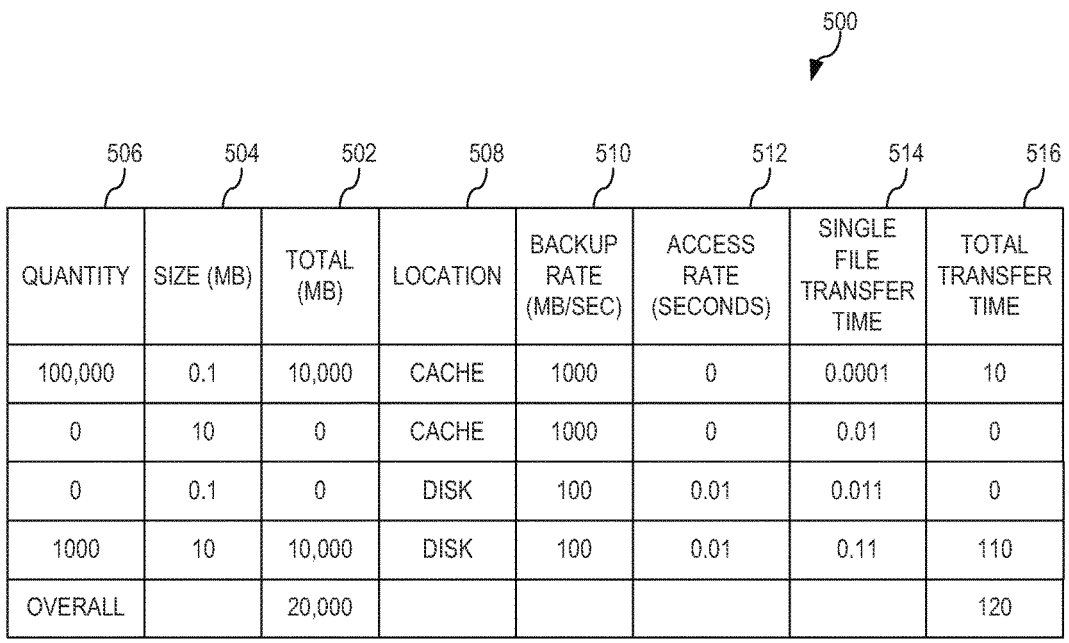
FIG. 5 depicts an exemplary diagram of a data processing system in which data files are backed up from both a cache and a disk subsystem using the pre-staging mechanism described in FIG. 4 in accordance with an illustrative embodiment.

FIG. 5 depicts an exemplary diagram of a data processing system in which data files are backed up from both a cache and a disk subsystem using the pre-staging mechanism described in FIG. 4 in accordance with an illustrative embodiment. In this example, data processing system 500 utilizes both a cache and a disk subsystem, where the pre-staging mechanism had pre-staged the 10,000 MB of small data files into the cache and the 10,000 MB of large data files are stored in the disk subsystem (Total Mega Byte (MB), column 502).

That is, 10,000 MB are small data files of size 0.1 MB (Size in MB, column 504), which are equivalent to 100,000 small data files (Quantity, column 506) are stored in the cache (Location, column 508) and 10,000 MB are large data files of size 10 MB (Size in MB, column 504), which are equivalent to 1000 large data files (Quantity, column 506) are stored in the disk subsystem (Location, column 508). Then a backup of each small data file in cache, at 1000 MB/second (Backup Rate, column 510) with a negligible access rate (Access Rate, column 512), would be 0.0001 seconds (Single File Transfer Time, column 514). For each large data file, the backup would be 0.11 seconds (Single File Transfer Time, column 514) at 100 MB/second (Backup Rate, column 510) with an access rate of 10 milli-seconds per data file (Access Rate, column 512). Thus, a backup of the 20,000 MB of data files from the cache and the disk subsystem would be 120 seconds (Total Transfer Time, column 516). When compared to the current practice shown in FIG. 3C, the time needed for backup of the data files in memory is greatly reduced from 615 seconds to 120 seconds.

Returning to FIG. 4, as previously described, the pre-staging of data files occurs prior to the start of the backup window and, although pre-staging itself requires some time to pre-stage the files into the cache, the pre-staging time is not part of the backup window itself. That is, pre-staging may be an ongoing process that always being performed within data processing 400 by pre-stage module 404. In, for example, current tiered storage systems, tiered storage system managers automatically moves data files between high-cost and low-cost storage media based on a frequency with which the data files are used. That is, more recently used data files are stored on upper tier high-speed storage devices, such as hard disk drive arrays, while less recently used files are stored on lower tier slower-speed storage devices, such as optical discs and magnetic tape drives. Tiered storage system managers perform this function because, while it would be ideal to have all data available on high-speed devices all the time, this is prohibitively expensive for many organizations. Instead, tiered storage system managers store the bulk of the data files on slower devices and then copy the data files to faster disk drives when needed.

In order to improve backup operations and thus reduce backup time, the illustrative embodiments provide an added step that continually pre-stages data files within memory 402. While the following is described with regard to a tiered storage system manager, the illustrative embodiments are not limited to working in conjunction with only tiered storage system managers. That is, one of ordinary skill in the art would recognize that the pre-staging mechanism of the illustrative embodiments may work in conjunction with any storage system manager without departing from the spirit and scope of the invention.

During operation of data processing system 400, cache 408 may reach a fill point that is above a predetermined threshold. At this point, current tiered storage system managers would receive an indication to make room in cache 408, which would cause the tiered storage system manager to initially identify a least recently used data file. Normally, this data file would immediately be moved from cache 408 to disk subsystem 410 and then the data file would be deleted from cache 408, thereby opening up more space in cache 408. However, in accordance with the illustrative embodiments, before the tiered storage system manager moves the data file to disk subsystem 410, pre-stage module 404 would verify whether the identified data file should be moved to disk subsystem 410 or whether another data file should be selected. In order to verify whether the data file should be moved, pre-stage module 404 identifies whether the data file is marked for backup. If (pre-stage module 404 determines that the data file is not marked for backup, then pre-stage module 404 allows the tiered storage system manager to continue with moving the data file from cache 408 to disk subsystem 410 and then deleting the data file from cache 408.

If pre-stage module 404 determines that the data file is marked for backup, then pre-stage module 404 determines whether the data file is a new data file or recently modified data file, i.e. a data file that is marked for backup but has not been previously backed up or has been modified since the last backup took place. If pre-stage module 404 determines that the data file is not anew data file or recently modified data file, then pre-stage module 404 allows the tiered storage system manager to continue with moving the data file from cache 408 to disk subsystem 410 and then deleting the data file from cache 408. If pre-stage module 404 determines that the data file is a new data file recently modified data file, then pre-stage module 404 determines whether the data file is smaller than or equal to a predetermined threshold, i.e. being classified as a smaller data file. If pre-stage module 404 determines that the file is greater than the predetermined threshold, then pre-stage module 404 allows the tiered storage system manager to continue with moving the data file from cache 408 to disk subsystem 410 and then deleting the data file from cache 408.

If pre-stage module 404 determines that the file is smaller than or equal to the predetermined threshold, then pre-stage module 404 marks the file as needing to be kept in cache 408 for backup purposes and sends a request to the tiered storage system manage to identify the next most least recently used data file. The process then starts over and iterates until an adequate amount of space has been freed up within cache 408. Thus, the pre-staging of data files, as opposed to only being performed when a backup operation is imminent, may be an ongoing process that further reduces the time needed for backup of the data files in memory 402 by always being prepared for a backup operation and that works in conjunction with other storage system managers.

As will be appreciated by one skilled in the art, the present invention may be embodied as a system, method. Or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, SmallTalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
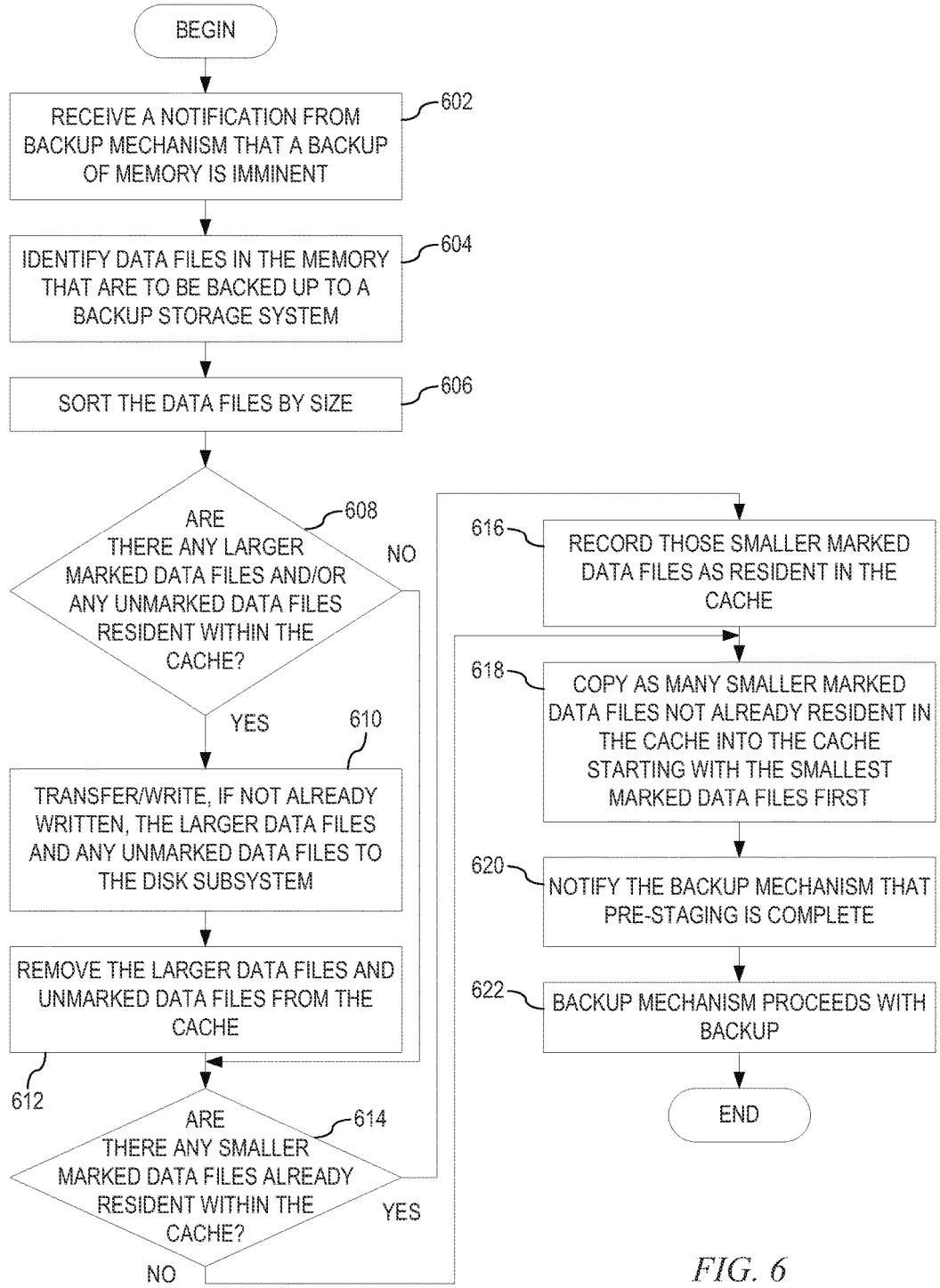
FIG. 6 depicts an exemplary flow diagram of the operation performed by a pre-staging mechanism executed by a processor for reducing the backup time of data files in a memory in accordance with an illustrative embodiment.

FIG. 6 depicts an exemplary flow diagram of the operation performed by a pre-staging mechanism executed by a processor for reducing the backup time of data files in a memory in accordance with an illustrative embodiment. As the operation begins, a pre-stage mechanism receives a notification from backup mechanism that a backup of memory is imminent (step 602). The pre-stage mechanism identifies data files in the memory that are to be backed up to a backup storage system (step 604). Depending on implementation, all of the data files in the memory may be marked for backup or only a portion of the files may be marked for backup based on a preference indicated by the user of the data processing system. If the backup that is to be performed is the initial backup, then the pre-stage mechanism may identify all of the marked data files in the memory for backup. If the backup is a backup subsequent to the initial backup, then the pre-stage mechanism may identify only those marked data files that have been modified since the last backup as well as any data files that have not been backed up before and are marked for backup. However, based on the user's preference, subsequent backups may backup all marked data files.

Once the pre-stage mechanism identifies all files that are to be backed up, then the pre-stage module sorts the data files by size (step 606). The pre-stage mechanism determines whether any of the larger marked data files as well as any unmarked data files are resident within the cache (step 608). If at step 608 there are larger marked data files resident within the cache and/or any unmarked data files, the pre-stage mechanism transfers/writes, if not already written, the larger data files and any unmarked data files to the disk subsystem (step 610). The pre-stage mechanism then removes the larger data files and unmarked data files from the cache thereby making room for smaller data files (step 612).

From step 612 or if at step 608 there are no larger marked data files resident within the cache and no unmarked data file, the pre-stage mechanism determines whether any of the smaller marked data files already reside in the cache (step 614). If at step 614 there are smaller marked data files resident within the cache, then the pre-stage mechanism records those smaller marked data files as resident in the cache and performs no further action with regard to that portion of smaller marked data files (step 616). From step 616 or if at step 614 there are no smaller marked data files resident within the cache, then the pre-stage mechanism proceeds to copy as many smaller marked data files not already resident in the cache into the cache starting with the smallest marked data files first (step 618). Again, by copying each small marked data file to the cache, then the pre-stage mechanism reduces the time required for performing the backup by multiples of the access time required to access each file from the disk subsystem.

As the pre-stage mechanism completes copying of the smallest data files to the cache, pre-stage mechanism notifies the backup mechanism that pre-staging is complete (step 620). The backup mechanism then proceeds to copy all of the marked data files first from the cache to backup storage system and then all remaining files from then disk subsystem to the backup storage system (step 622), with the operation terminating thereafter.

FIG. 7 depicts an exemplary flow diagram of an ongoing operation performed by a pre-staging mechanism executed by a processor in accordance with an illustrative embodiment. As the operation begins, a storage system manager receives an indication that the data files in a cache of a data processing system have exceeded a predetermined cache size threshold (step 702). The storage system manager identifies a least recently used data file within the cache (step 704). A pre-stage mechanism then determines whether the identified data file is marked for backup (step 706).

If at step 706 the pre-stage mechanism determines that the data file is marked for backup, then the pre-stage mechanism determines whether the data file is anew data file or recently modified data file (step 708). That is, the pre-stage mechanism determines whether the identified data file has not been previously backed up or has been modified since the last backup took place. If at step 708 the pre-stage mechanism determines that the data file is anew data file or recently modified data file, then the pre-stage mechanism determines whether the data file is smaller than or equal to a predetermined data file size threshold (step 710). If at step 710 the pre-stage mechanism determines that the data file is smaller than or equal to the predetermined data file size threshold, then the pre-stage mechanism marks the data file as needing to be kept in the cache for backup purposes (step 712) and sends a request to the tiered storage system manage to identify the next most least recently used data file (step 714), with the operation returning to step 706 thereafter.

If at step 706 the pre-stage mechanism determines that the data file is not marked for backup, if at step 708 the pre-stage mechanism determines that the data file is not a new data file or recently modified data file, or if at step 710 the pre-stage mechanism determines that the data file is greater than the predetermined data file size threshold, then the pre-stage mechanism notifies the storage system manager that the identified data file may be moved from cache to a disk subsystem and then deleted from the cache (step 716). The storage system manager then determines whether an adequate amount of space has been freed up within the cache by determining whether the total size of the data files in the cache still exceed the predetermined cache size threshold (step 718). If at step 718 the storage system manager determines that an adequate amount of space has not been freed up within the cache, the operation proceeds to step 714. If at step 718 the storage system manager determines that an adequate amount of space has been freed up within the cache, the operation terminates.

Thus, the pre-staging of data files, as opposed to only being performed when a backup operation is imminent, may be an ongoing process that further reduces the time needed for backup of the data files in the memory by always being prepared for a backup operation and that works in conjunction with other storage system managers.

Thus, the illustrative embodiments provide mechanisms for reducing backup time by reducing the access time of accessing the data files from a disk subsystem. In order to obtain the greatest reduction in the time required to perform a backup without the expense of adding additional cache, the illustrative embodiments provide a pre-stage module that prioritizes the data files such that greatest number of small data files reside in the cache prior to the beginning of a backup process.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
   pre-stage data files in a memory to be backed up to a backup storage system separate from the computing device by further executing computer readable program that causes the computing device to:
      identify the data files in the memory to be backed up to the backup storage system;
      sort the data files by size, thereby forming a set of small data files and a set of large data files; and
      copy the set of small data files to a cache within the memory while leaving the set of large data files in a disk subsystem within the memory; and
   back up the set of small data files from the cache to the backup storage system and the set of large data files from the disk subsystem to the backup storage system, wherein a time required to back up the set of small data files from the cache to the backup storage system is performed at a faster rate as compared to backing up the set of large data files from the disk subsystem to the backup storage system due to a reduction in access time required to access each of the small data files from the cache.

2. The computer program product of claim 1, wherein the pre-staging is performed in response to a notification from backup mechanism that a backup of the memory is imminent.

3. The computer program product of claim 1, wherein the set of small data files are copied to the cache based on size starting with the smallest data file first.

4. The computer program product of claim 1, wherein the computer readable program further causes the computing device to:
   determine whether one or more of the set of large data files are resident within the cache;

responsive to the existence of one or more large data files residing within the cache, write the one or more large data files to the disk subsystem; and remove the one or more large data files from the cache, thereby making room for the set of small data files.

5. The computer program product of claim 1, wherein the computer readable program further causes the computing device to:

determine whether one or more of the set of small data files reside within the cache; and responsive to one or more small data files existing within the cache, ignore the copying of the one or more small data files existing within the cache from the disk subsystem.

6. The computer program product of claim 1, wherein only a subset of the data files are to be backed up to the backup storage system, thereby forming a set of marked data files and a set of unmarked data files.

7. The computer program product of claim 6, wherein the computer readable program further causes the computing device to:

determine whether any of the set of unmarked data files are resident within the cache;

responsive to the existence of one or more unmarked data files within the cache, write the one or more unmarked data files to the disk subsystem; and remove the one or more unmarked data files from the cache, thereby making room for the set of small data files.

8. The computer program product of claim 6, wherein only marked data files in the set of marked data files that have been modified since a last backup and any new marked data files are backed up to the backup storage system.

9. An apparatus, comprising:

a processor; and a memory coupled to the processor, wherein the memory comprises instructions which, when executed by the processor, cause the processor to:

pre-stage data files in the memory to be backed up to a backup storage system separate from the data apparatus by further executing instructions that cause the processor to:

identify the data files in the memory to be backed up to the backup storage system;

sort the data files by size, thereby forming a set of small data files and a set of large data files; and copy the set of small data files to a cache within the memory while leaving the set of large data files in a disk subsystem within the memory; and back up the set of small data files from the cache to the backup storage system and the set of large data files from the disk subsystem to the backup storage system, wherein a time required to back up the set of small data files from the cache to the backup storage system is performed at a faster rate as compared to backing up the set of large data files from the disk subsystem to the backup storage system due to a reduction in access time required to access each of the small data files from the cache.

10. The apparatus of claim 9, wherein the instructions further cause the processor to:

determine whether one or more of the set of large data files are resident within the cache;

responsive to the existence of one or more large data files residing within the cache, write the one or more large data files to the disk subsystem; and remove the one or more large data files from the cache, thereby making room for the set of small data files.

11. The apparatus of claim 9, wherein the instructions further cause the processor to:

determine whether one or more of the set of small data files reside within the cache; and responsive to one or more small data files existing within the cache, ignore the copying of the one or more small data files existing within the cache from the disk subsystem.

12. The apparatus of claim 9, wherein only a subset of the data files are to be backed up to the backup storage system, thereby forming a set of marked data files and a set of unmarked data files.

13. The apparatus of claim 12, wherein the instructions further cause the processor to:

determine whether any of the set of unmarked data files are resident within the cache;

responsive to the existence of one or more unmarked data files within the cache, write the one or more unmarked data files to the disk subsystem; and remove the one or more unmarked data files from the cache, thereby making room for the set of small data files.

14. The apparatus of claim 12, wherein only marked data files in the set of marked data files that have been modified since a last backup and any new marked data files are backed up to the backup storage system.

15. The apparatus of claim 9, wherein the pre-staging is performed in response to a notification from backup mechanism that a backup of the memory is imminent.

16. The apparatus of claim 9, wherein the set of small data files are copied to the cache based on size starting with the smallest data file first.

* * * * *